(12) United States Patent
Cue et al.

(10) Patent No.: US 8,249,939 B2
(45) Date of Patent: Aug. 21, 2012

(54) CUSTOM STORES

(75) Inventors: Eduardo Cue, Mountain View, CA (US); Shaun Hilton, Saratoga, CA (US); Glenn D. Epis, Sunnyvale, CA (US); Judy D. Halchin, Cupertino, CA (US); Susan Pfendt, Santa Clara, CA (US); Cathy Ridenour, Campbell, CA (US)

(73) Assignee: Apple Inc., Cupertino, CA (US)

( * ) Notice: Subject to any disclaimer, the term of this patent is extended or adjusted under 35 U.S.C. 154(b) by 549 days.

(21) Appl. No.: 12/407,149

(22) Filed: Mar. 19, 2009

(65) Prior Publication Data

US 2009/0177551 A1 Jul. 9, 2009

Related U.S. Application Data

(63) Continuation of application No. 09/545,034, filed on Apr. 6, 2000.

(51) Int. Cl.
*G06Q 30/00* (2012.01)

(52) U.S. Cl. .......................................... 705/26; 705/27

(58) Field of Classification Search ................ 705/26, 705/27
See application file for complete search history.

(56) References Cited

U.S. PATENT DOCUMENTS

| 5,481,094 A | 1/1996 | Suda |
| 5,970,475 A | 10/1999 | Barnes et al. |
| 6,029,141 A | 2/2000 | Bezos et al. |
| 6,035,287 A | 3/2000 | Stallaert et al. |
| 6,058,373 A | 5/2000 | Blinn et al. |
| 6,167,383 A * | 12/2000 | Henson ................... 705/26.5 |
| 6,182,275 B1 | 1/2001 | Beelitz et al. |
| 6,285,986 B1 | 9/2001 | Andrews |
| 6,704,797 B1 | 3/2004 | Fields et al. |
| 7,340,451 B2 | 3/2008 | Sacco |
| 7,424,445 B1 | 9/2008 | Cue et al. |
| 7,634,427 B1 * | 12/2009 | Kennedy .................. 705/26.81 |

FOREIGN PATENT DOCUMENTS

| DE | 199 40 209 A1 | 3/2000 |
| EP | 0 852 351 A2 | 7/1998 |
| JP | 10-124526 | 5/1998 |
| JP | 10-254796 | 9/1998 |
| JP | 10-254829 | 9/1998 |
| JP | 11-213038 | 8/1999 |
| JP | 2000-099577 | 4/2000 |
| WO | WO 9945487 | 9/1999 |

OTHER PUBLICATIONS

Joseph E Maglitta, Special Dell-ivery, Electronic Business. Highlands Ranch: Dec. 1997.vol. 23, Iss. 12; p. 43, retrieved from ProQuest Direct on the Internet on Nov. 10, 2006, 8 pages.*
Japanese Office Action issued Mar. 26, 2007, in Japanese Application No. 2001-574649.
Japanese Office Action issued Dec. 1, 2006, in Japanese Application No. 2001-574649.
Hypertext Transfer Protocol, version 1.0, May 1996, downloaded from http:/www.ietf.org/rfc/rfc1945.txt on Nov. 8 2006.

(Continued)

*Primary Examiner* — James Zurita
(74) *Attorney, Agent, or Firm* — Buchanan Ingersoll & Rooney PC

(57) ABSTRACT

A custom store web page uses an external administrator to provide configuration data for a custom store web page. The configuration data can include virtual bundles of products for sale.

15 Claims, 10 Drawing Sheets

OTHER PUBLICATIONS

Maglitta, Special Dell-ivery, Electronic Business, Highlands Ranch, Dec. 1997, vol. 23, iss. 12, p. 43, downloaded from the Internet on Dec. 6, 2008, 10 pages.

09_544718_n_545034_ScreenImages_AppleStoreEducation_02.doc, 4 pages, printed on Nov. 10, 2006, cited on Nov. 8, 2006 in related U.S. Appl. No. 09/544,718.

09_544718_n_545034_ScreenImages_StoreAppleCom_01.doc, 3 pages, printed on Nov. 10, 2006, cited on Nov. 8, 2006 in related U.S. Appl. No. 09/544,718.

09_544718_n_545034_ScreenImages_StoreAppleCom_03.doc, 1 page, printed on Nov. 10, 2006, cited on Nov. 8, 2006 in related U.S. Appl. No. 09/544,718.

* cited by examiner

FIG. 6-1

| Description Edit Delete | Description Edit Delete | Description Edit Delete |
|---|---|---|
| Mike's System | Display | Powerbook |

Product Info URL: http:\\www.apple.com   Display Order [7]   Configurable:   Price: $3,042.00

Macintosh Server G4
*Accessory kit
*RAGE 128 Pro card-16MB SDRAM
*10/100BASE-T Ethernet built-in
*DVD-ROM drive with DVD-Video
*18GB Ultra2 SCSI, 2-channel card
*400MHz PowerPC G4-1MB L2 cache
*Ultra SCSI PCI card & cable adapter
*256MB SDRAM-1 DIMM
*USB Keyboard Product Info URL:   Display Order [10]   Configurable:   Price: $1,836.00 iBook 366MHz Special Edition
*Graphite
*CD-ROM drive
*128MB SDRAM-1 SO DIMM
*6GB IDE drive Product Info URL:   Display Order [11]   Configurable:   Price: $1,731.00 iBook 300MHz
*AirPort Card
*Tangerine
*CD-ROM drive
*6GB IDE drive
*128MB SDRAM-1 SO DIMM

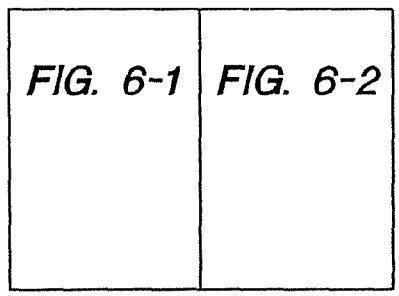

| FIG. 6-1 | FIG. 6-2 |
|---|---|

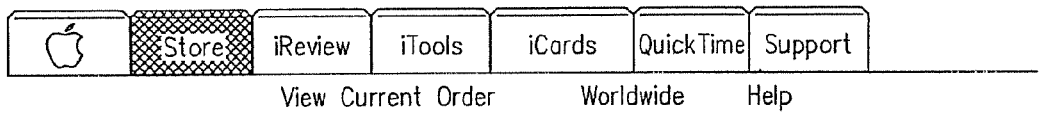

AppleStore

Recommendations of Denver Public Schools

Zip drive bundle
Power Mac G4 450MHz
$2,166.00

( Select )

Science Lab G4
Power Mac G4
∗RAGE 128 Pro card–16MB SDRAM
∗10/100BASE-T Ethernet built-in
∗56K internal modem with FAXstf
∗DVD-ROM drive with DVD-Video
∗10GB Ultra ATA drive
∗Accessory kit
∗256MB SDRAM-1 DIMM
∗400MHz PowerPC G4-1MB L2 cache
$1,792.00

( Select )

OS X Server
Macintosh Server G4 with Mac OS X Server
∗512MB SDRAM-2 DIMMs
∗Accessory kit
∗DVD-ROM drive
∗36GB Ultra2 SCSI, 2-channel card
∗USB Keyboard
∗Four-port 10/100 Ethernet PCI card
∗RAGE 128 Pro card–16MB SDRAM
∗500MHz PowerPC G4-1MB L2 cache
∗Ultra SCSI PCI card & cable adapter
$5,168.00

( Select )

Type-matched G4
Iomega USB Zip Disk 6-pack
$188.00

( Select )

iMac SE
PowerBook
∗500MHz PowerPC G3 with 1MB L2 cache
∗18GB Ultra ATA drive
∗128MB SDRAM – 1 SO DIMM
Extra AC Power Adapter
Extra Lithium-ion Rechargeable Battery
$3,469.00

( Select )

G4 Server
iBook 366MHz Special Edition
∗128MB SDRAM-1 SO DIMM
∗CD-ROM drive
∗6GB IDE drive
∗Graphite
$1,836.00

( Select )

Mike's System
Macintosh Server G4
∗Accessory kit
∗RAGE 128 Pro card–16MB SDRAM
∗10/100BASE-T Ethernet built-in
∗DVD-ROM drive with DVD-Video
∗18GB Utra2 SCSI, 2-channel card
∗400MHz PowerPC G4-1MB L2 cache
∗Ultra SCSI PCI card & cable adapter
∗256MB SDRAM-1 DIMM
∗USB Keyboard
More Product Info
$3,042.00

( Select )

Display
iBook 366MHz Special Edition
∗Graphite
∗CD-ROM drive
∗128MB SDRAM-1 SO DIMM
∗6GB IDE drive
$1,836.00

( Select )

Powerbook
iBook 300MHz
∗AirPort Card
∗Tangerine
∗CD-ROM drive
∗6GB IDE drive
∗128MB SDRAM-1 SO DIMM
$1,731.00

( Select )

*FIG. 8*

CUSTOM STORES

BACKGROUND OF THE INVENTION

The present invention relates to electronic commerce sites, especially electronic commerce sites designed for the use of members of a group.

Recently, with the expansion of the Internet, electronic commerce sites have become a powerful new way to buy and sell products. Typically, a consumer goes to a vender's web site, selects a desired product, and purchases it using a credit card. The credit card information is usually encrypted in its transfer across the Internet to provide security. Upon verifying the credit-card information, the product(s) selected by the consumer are mailed from the vendor's warehouse to the consumer.

Typically, electronic commerce sites are arranged as server systems. A web server receives requests from a client computer. The web server is associated with an application server that runs applications for the web server. Databases at the server system are used to store the item data including prices for the products on sale.

It is desired to have an electronic commerce site especially tailored for certain groups. For example, in some situations it is useful to have an electronic commerce site for students of a specific university.

One way to set up such a customized site is to have a designer produce a custom web site for each group. This can be quite time consuming if the number of custom sites is large. Additionally, consistency between the main store site and each custom store site becomes a significant problem as the number of custom sites increases. This is especially the case for electronic commerce sites in which prices and available products change constantly. For example, computer vendor web sites have component prices and availabilities that change daily.

It is desired to have an improved way of providing a custom store for an electronic commerce site.

SUMMARY OF THE PRESENT INVENTION

One embodiment of the present invention is a system in which an external administrator associated with a group produces configuration data for an electronic commerce custom web site. The configuration data is stored in a database for a server system. The configuration data produced by the administrator and stored in the database is used to create the custom store web site. Since an external administrator produces the configuration data, the internal vendor cost required to produce the custom store web site is minimized.

In a preferred embodiment, the custom store site is a modification of a main electronic commerce store site. The configuration data produced by the external administrator can include bundles of products to be sold, the blocking of certain products from being purchased, and other configurations.

In one embodiment, the server system also includes instantiation software for setting up the custom web page. Typically, the vendor sets up an instance of a custom store which can then be modified by the external administrator with the custom configuration data. The setup information includes discount schedule, custom store I.D., and the like. In one embodiment, once a custom store is instantiated, the external administrator is supplied with a universal resource locator (URL) for an administrative site that allows for the creation of the configuration data for the custom site.

In one embodiment, reconciliation software at the server system is used to examine the product bundles created at a custom site to check for obsolete products and produce electronic mail messages to the external administrator requiring changes or suggesting upgrades for the bundles of products.

Another embodiment of the present invention is a server system adapted to produce a custom web store page for a vendor. The custom web store page is associated with and for the use of a group other than the vendor. A custom store web page is constructed using data from a database. An external computer operatively connected to the server system is also used. This external computer is associated with the custom store administrator for the group. The external computer is adapted to provide configuration data to the server system. The server system is adapted to use configuration data to arrange a portion of the custom store web page for the use of group members. The configuration data is stored in the database.

Yet another embodiment of the present invention concerns a computer-readable media containing a program that executes the following procedure. As a result of web page configuration data sent from an external computer, storing configuration data in a database. The external computer is associated with a custom store administrator for a group other than the vendor. The configuration data is usable to arrange a portion of the vendor's custom store web page for the use of the group members. The program also executes the step of producing the custom store web page for a group member. The custom store web page being constructed using data from the database. The data including the configuration data.

Still another embodiment of the present invention comprises an apparatus including means for receiving configuration data sent from an external computer and for storing the configuration data in a database. The external computer is associated with a custom store administrator for a group other than the vendor. The configuration data is usable to arrange at least a portion of the vendor's custom store web page for the use of group members. The apparatus also includes means for producing the custom store web page for a group member, the custom store web page being constructed using data from the database which includes configuration data.

BRIEF DESCRIPTION OF THE FIGURES

FIG. 6 illustrates a web page for the external administrator to produce the configuration data for creating a custom store web site according to one embodiment of the present invention.

FIG. 8 is a diagram of a web page illustrating a recommended system page of one embodiment of the present invention.

DETAILED DESCRIPTION OF THE PREFERRED EMBODIMENT

Figure 1:
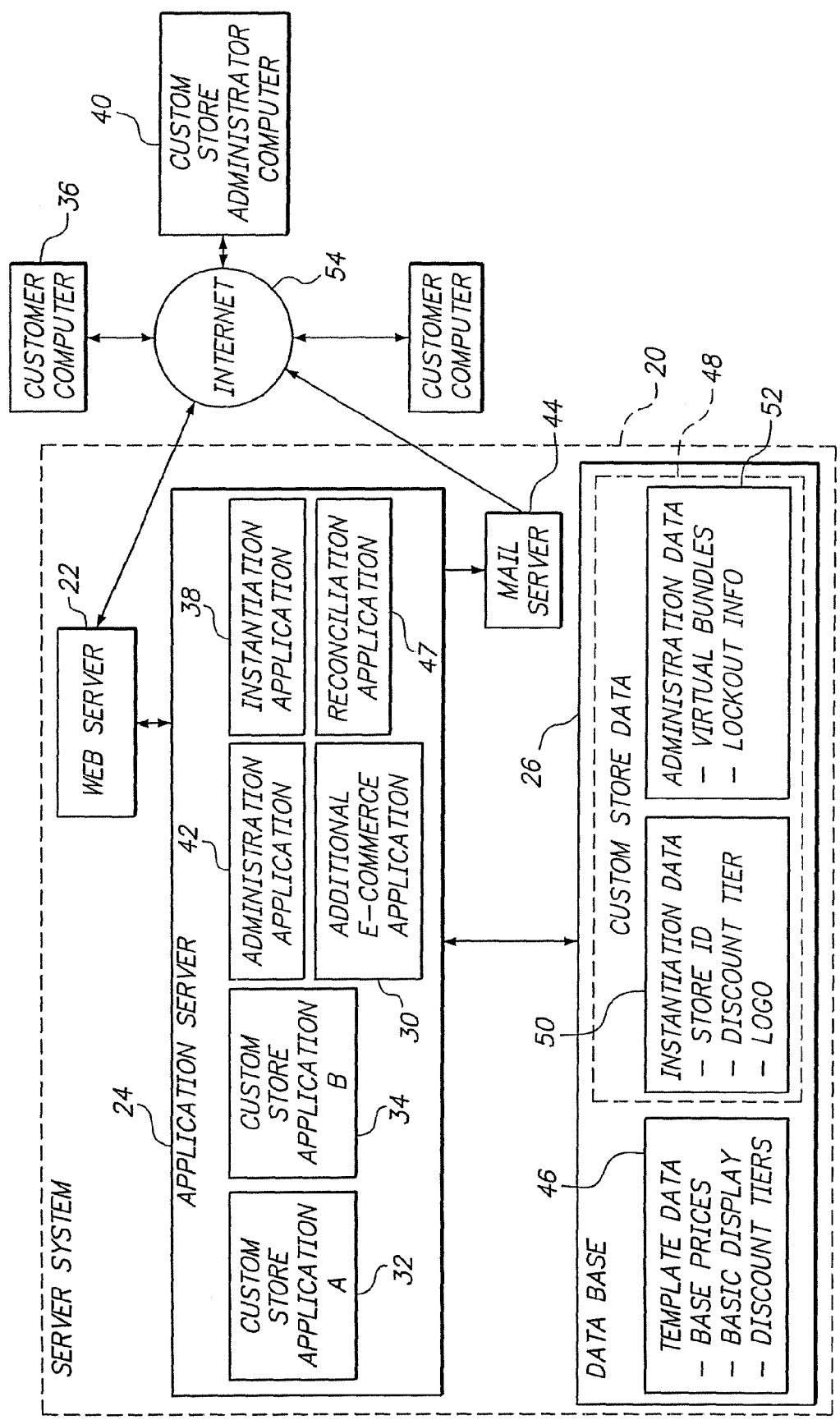
FIG. 1 is a diagram that illustrates a server system of one embodiment of the present invention.

FIG. 1 illustrates a server system 20 which can be used to produce a custom store of the present invention. The server system in this embodiment includes a web server 22, an application server(s) 24, and a database 26. The application server 24 includes a number of software applications which aid in the construction of the custom store. A firewall (not shown) between web server 22 and application server 24 limits access from the outside world into the internal computer systems. The web server 22 sends requests to the application server 24 which are used in the construction of web sites. In a preferred embodiment, the custom stores are dynamically created using data stored in database 26. This allows for discounts, price changes, and external administrator configuration changes to be quickly and easily implemented. The web server 22 preferably interfaces with the application server 24 using a protocol such as the Common Gateway Interface (GCI) protocol. The application server 24 can include a number of conventional electronic commerce applications 30. In addition to the convention applications, additional applications which aid in the construction of the custom store are also used. For example, a number of custom store applications 32 and 34 are used. Each of these custom store applications can be used for a specific type of custom store. For example, custom store application A 32 produces custom stores for university students, while custom store application B 34 produces custom stores for institutional purchasers. Each custom store application is used for the dynamic production of a number of different custom web sites.

When a group member at computer 36 uses a browser to go to a custom store, custom store application creates the custom store. The custom store application preferably uses data in database 26 to construct the custom store. Preferably, a store I.D. number is included in the URL sent from the customer computer 36. The custom store application uses this I.D. number to create the correct custom web site.

The instantiation application 38 is used to set up a custom store. Instantiation data, including the store I.D. and the discount tier for the custom store is stored in the database. Additionally, a URL can be sent to the external custom store administrator using the custom store administrator computer 40. The URL allows the external administrator access to the administration application 42. The administration application 42 allows the administrator to interface with the server system to create the configuration data for the web site data stored in the database 26. As will be described in more detail below, the configuration data can include virtual bundles of products which are recommended to be purchased by the members of the group, as well as the blocking of certain products from purchase at the custom web site.

The reconciliation application 47 examines the configuration data to see if any changes need to be made to the custom store. For example, if a product in a virtual bundle of products becomes obsolete, notification of the need to change the bundle is created. The reconciliation application 47 preferably does such a check overnight and then creates notification E-mails to the external administrators who then make changes to the suggested products sold at the custom web sites. The reconciliation application 47 sends the information using the mail server 44.

The database 26 includes the data used to create the custom store. The template data 46 includes the base prices, basic display information for the main electronic commerce site, discount tiers and the like. The custom store data 48 includes instantiation data 50 as well as configuration or administration data 52 which is controlled by the external administrator of the custom store.

The server system 20 is connected through the Internet 54 to external computers including customer computer 36 and administrator computer 40. In one embodiment, multiple application servers run the system of the present invention. Alternatively, different software applications can be located on different application servers in one server system.

Internal direct connections (not shown) to the application server 24 can also be used. These direct connections can be used for the operation of the instantiation application 38 as well as to provide internal access to the custom web pages to internal telephone agents.

Figure 2A:
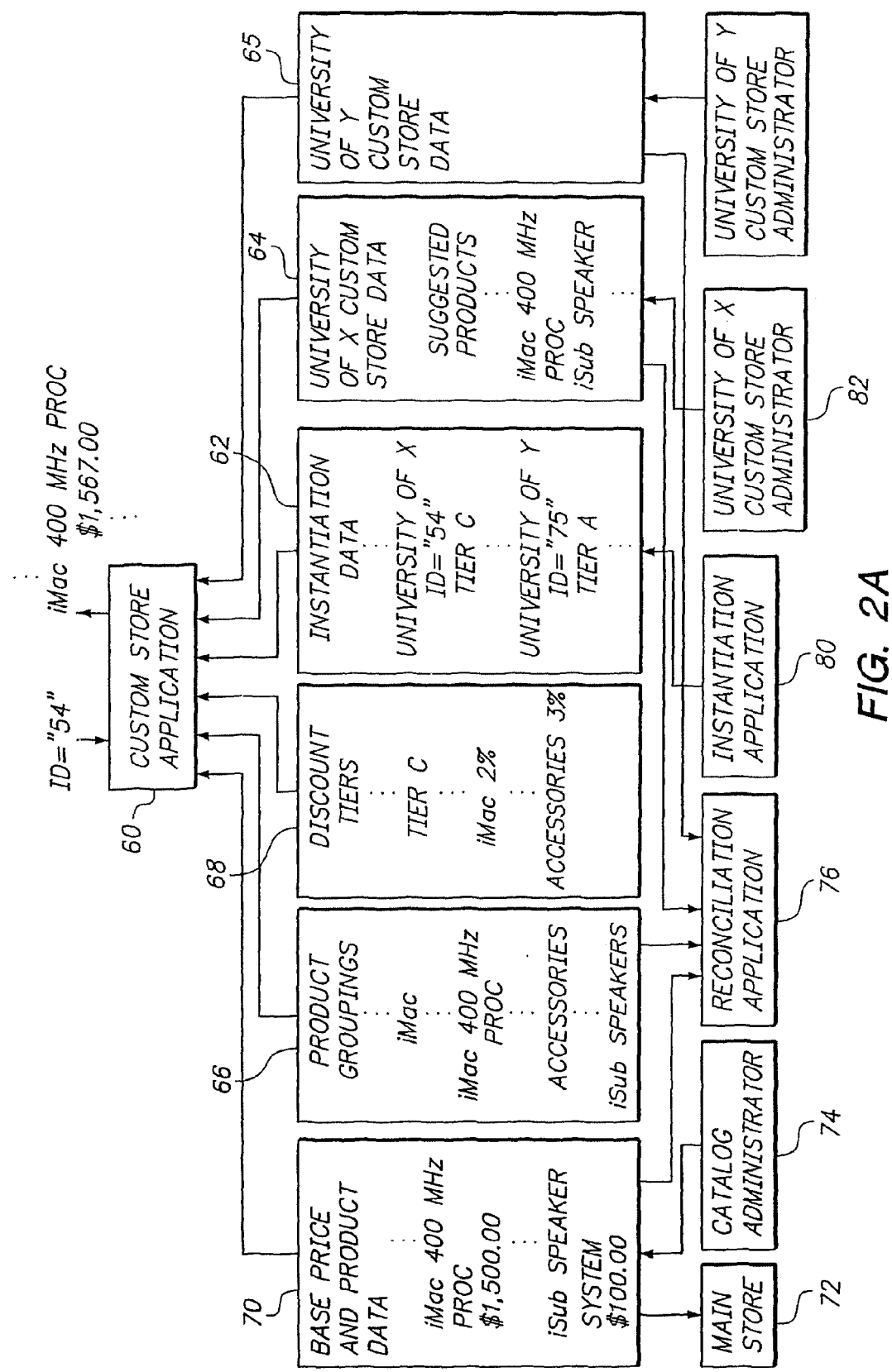
FIGS. 2A and 2B are diagrams that illustrates the operation of the database in the construction of the custom store web site for embodiment of the present invention.

FIG. 2A illustrates an example of one arrangement of the data in the database and the creation of a custom store web site using this database. In this example, custom store application 60 receives a custom web store request including an ID "54" identifying the custom store. The custom store application 60 checks the instantiation data 62 to see which custom store has the ID "54". In this example, the University of X has the ID "54". Next, the University of X custom store administration data 64 is checked to see which products should be displayed on the custom store web page. In this example, an iMac 400 MHZ processor with an iSub speaker system is a suggested product. The custom store application 60 then checks the product grouping list 66 to determine that the iMac 400 MHZ processor is in the product grouping "iMac" and the iSub speaker system is in the product grouping "Accessories." The University of X is in the discount tier "C". The discount tier data 68 is checked to determine that iMacs have a two-percent discount and accessories have a three-percent discount for tier C sites. The base price data 70 is checked to determine that the iMac 400 MHZ processor has a base price of $1,500 and the iSub speaker system has a base price of $100. Next the custom store application 60 calculates the discount price ($1,567) to display in the custom web site.

The system shown in FIG. 2A separates the base price data 70 from the custom store data. This allows the discount custom web site prices to be automatically modified when the base price data is changed. The base price data 70 can be used by main store application 72. The reconciliation application 76 checks the changes to the product grouping 66 (or uses some other signal indicative of a change to the product line) against the data in the individual custom store data 64 and 65. For example, if the iSub speaker system is deleted from the product line, the reconciliation application 76 determines that the University of X has that product in a suggested system and sends an E-mail to the custom store administrator for the University of X to have the custom store administrator modify the suggested products. The operation of the reconciliation application 76 can thus be done automatically without requiring updating by employees.

In one embodiment, the reconciliation application 76 can also suggest upgrades to the virtual bundles. For example, if the bundle was created a while ago, upgrade suggestions can be made to upgrade the suggested products in the bundle even when the products have not been deleted from the product list.

The instantiation application 80 is used to produce the instantiation data 62. This instantiation data can include the custom store I.D., discount tier I.D., and other setup data. The University of X custom store administrator 82 produces the University of X custom store administration data including the suggested products, blocked products, display configuration information, and other configuration data.

FIG. 2A illustrates the data as text strings but in a preferred embodiment the data is stored in the database in an optimized manner that speeds the creation of the custom store web pages.

Figure 2B:
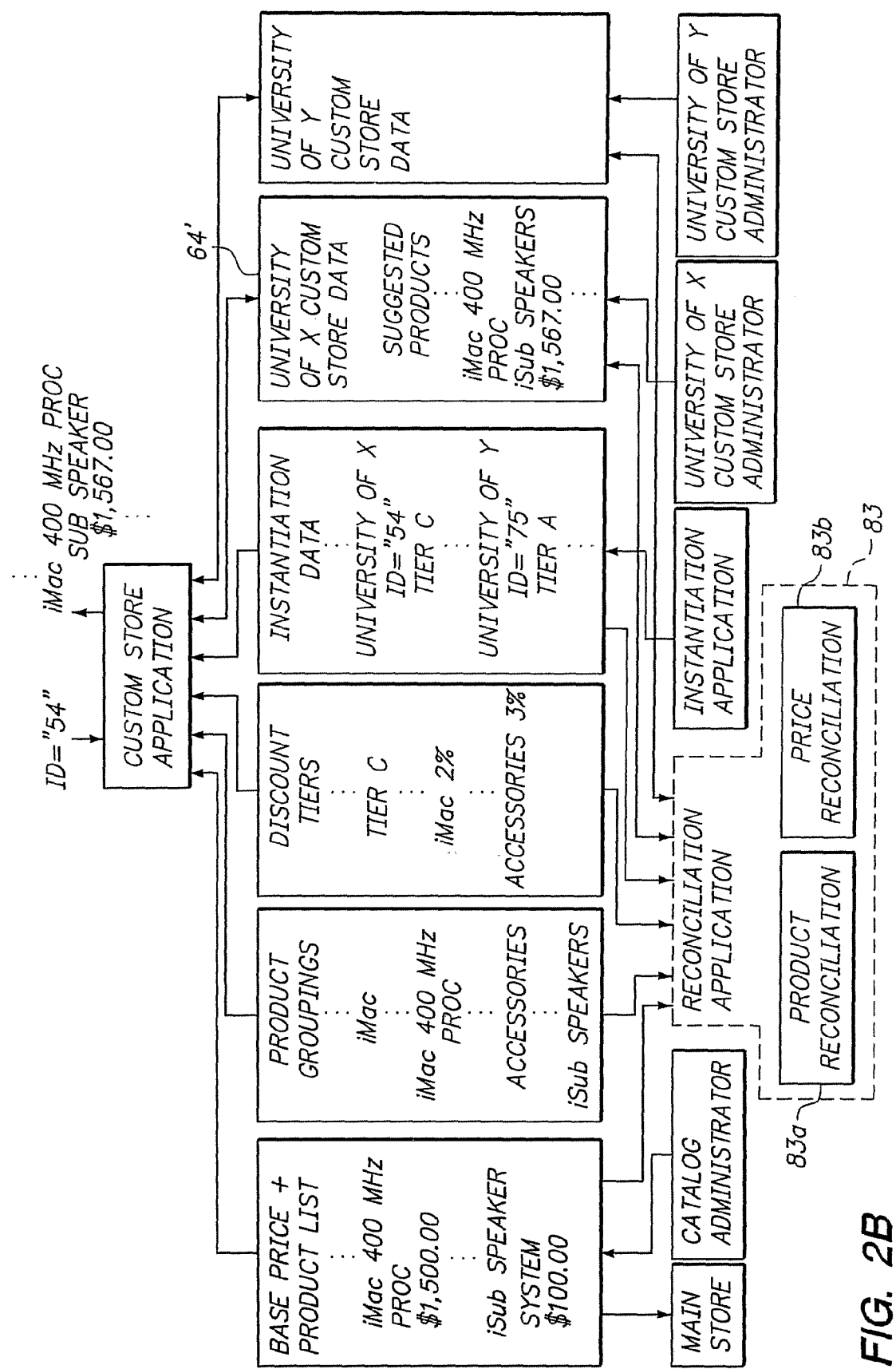

FIG. 2B illustrates an alternate embodiment of the present invention. In this alternate embodiment, the reconciliation application 83 includes both a product reconciliation module 83*a* and a price reconciliation module 83*b*. In this embodiment, the discounted price for the suggested system is stored in the custom store data 64'. Periodically, the price reconciliation module 83*b* recalculates the discount prices for each suggested system for each of the custom stores. When the user goes to a custom store, the store discount price data can then be quickly displayed to the user. This speeds up the construction of the custom store display. Additionally, a recalculation of the correct discount price can be done when a user purchases a suggested system.

Figure 3:
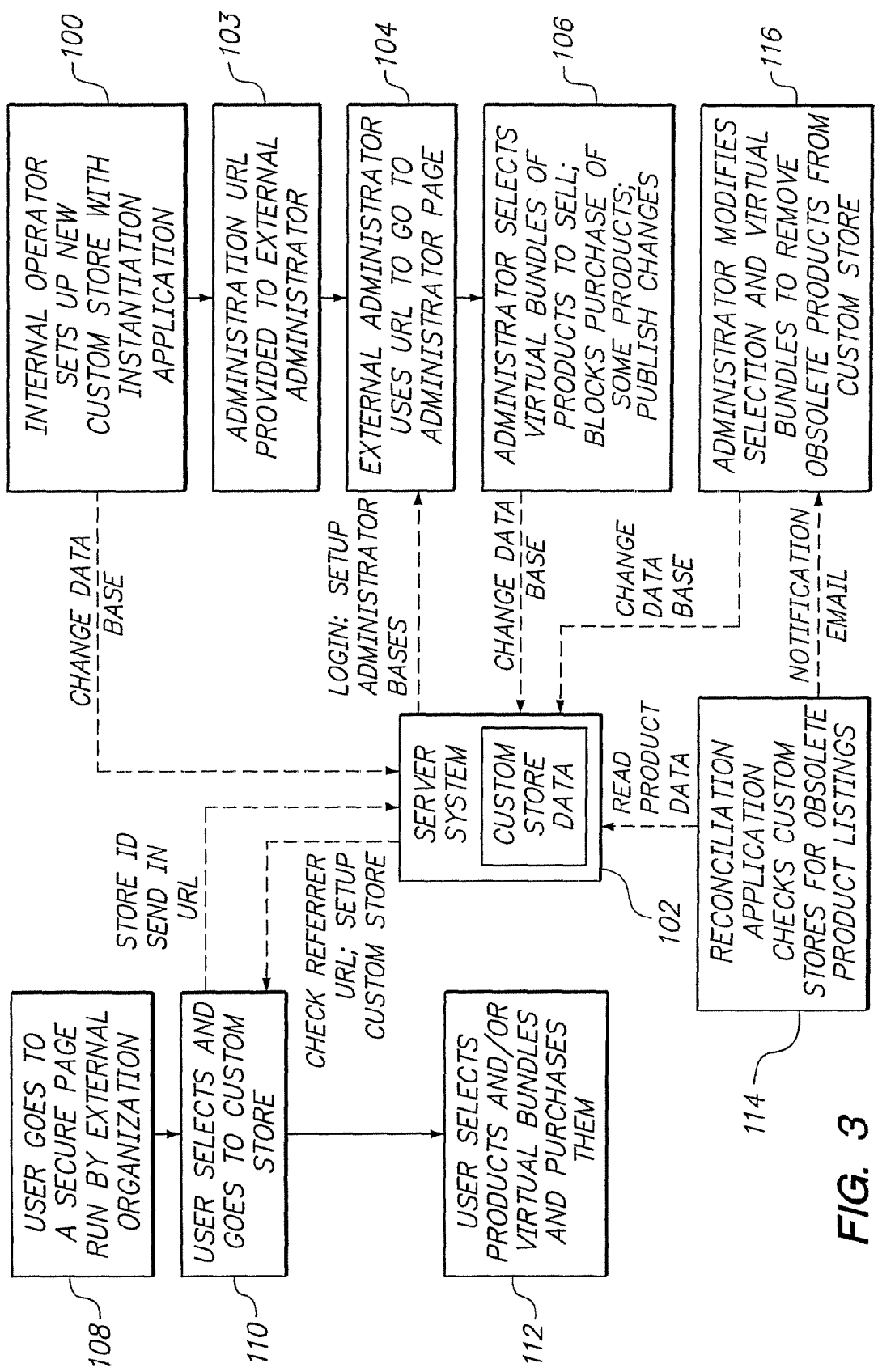
FIG. 3 is a diagram that illustrates the operation of one embodiment of the present invention for creating and using a custom store web site.

FIG. 3 is a diagram that illustrates the operation of one embodiment of the present invention. In block 100, the vendor sets up a new custom store using the instantiation application. This causes the database in the server system 101 to be changed. The administration URL is provided to the external administrator in step 102. In step 104, the external administrator uses the URL to go to an administration page created by the server system 101. The administrative page preferably includes a log-in system to authenticate the external administrator. An example of an administration page is discussed below with respect to FIGS. 6A and 6B. In step 106, the administrator selects virtual bundles of products to sell at the custom store and blocks purchase of other products. Upon the publishing of the changes, data in the database is modified.

A user goes to a secure page run by the external organization or group in step 108. The user can select and go to the custom store page in step 110. The use of the secure page run by the external organization is described in detail below with respect to FIG. 4. This step adds security to the operation of the present invention. In step 110, the correct custom web page is created. In step 112, the user selects the products or virtual bundles and purchases them from the custom store.

In step 114, the reconciliation application checks the custom stores for obsolete product listings. A notification E-mail sent to the administrator in step 116 and the administrator can modify the selections and virtual bundles to remove obsolete products from the custom store.

Figure 4:
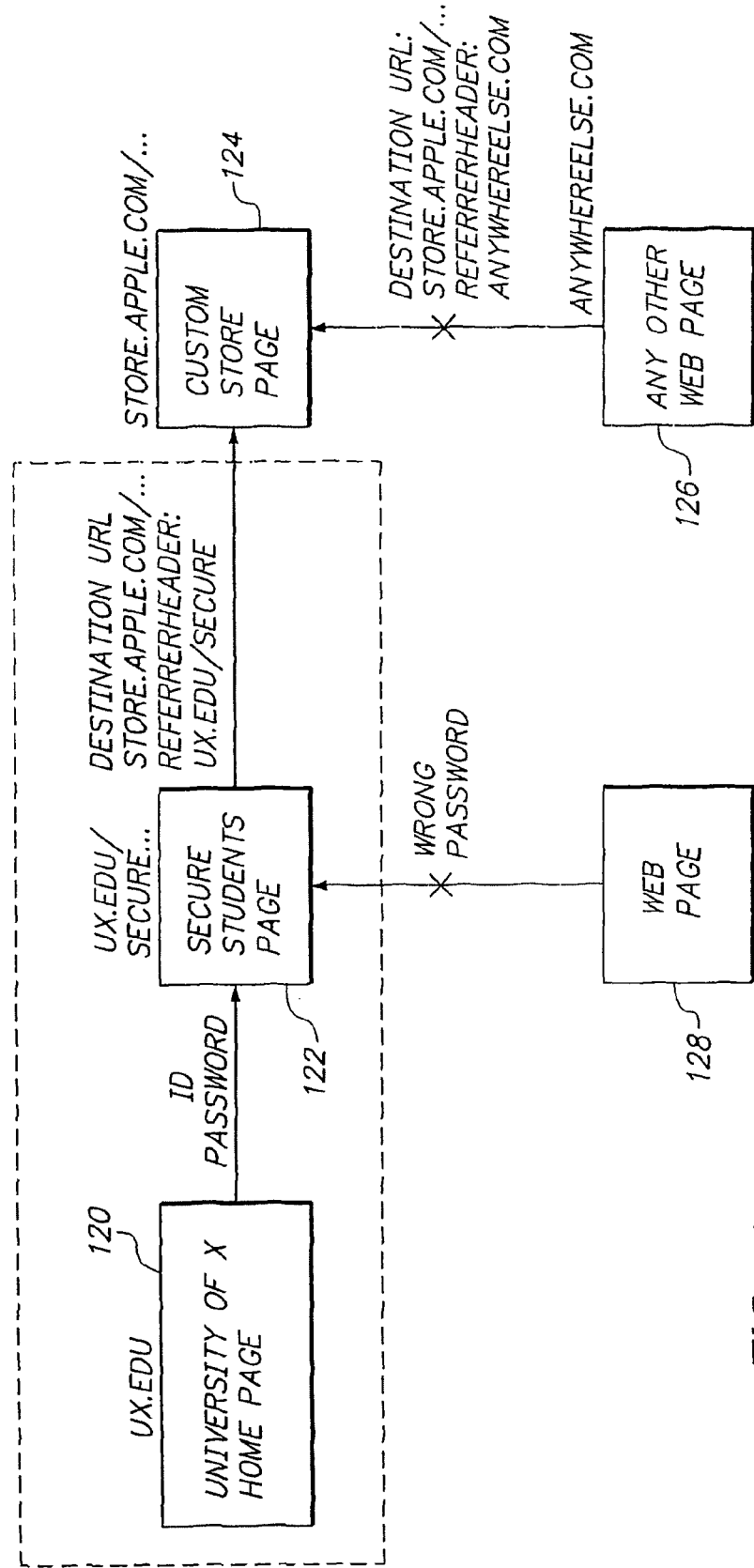
FIG. 4 is a diagram that illustrates a security feature of one embodiment of the present invention.

FIG. 4 illustrates one example of a security system used with the present invention. In this example, a customer goes to a home page 120 of the University, such as the University of X. The customer types in an I.D. and password provided by the University so that the customer can go to a secure page 122. From the secure student page 122, the customer can go to the custom store page 124. The custom store application checks the referer header field of the HyperText Transfer Protocol (HTTP) header that indicates the URL of the location from which a URL request is sent. Alternately, some portion of the entire URL, such as the host name, could be used. The custom store application for the custom store 124 checks the referrer field of the HTTP header before allowing a display of the custom store data 124. The URL for the customer store includes a custom store I.D. The custom store application can then check the referer field of the HTTP header for that custom store I.D. In this example, the correct referer field value indicates the secure student's page 122. If the correct referrer header is not given, the custom store information is not sent to the user. In this embodiment, only the members of the group are allowed access to the custom store page. This is useful if discounts are provided at the custom store.

An advantage of the system of FIG. 4 is that the vendor server need not keep a list of the I.D.s and passwords for each of the group members. The maintenance and control of the I.D.s and passwords is done by the group itself. This reduces the data requirements at the vendor server, as well as significantly reducing the maintenance requirements for the custom stores. For example, it would be difficult for the vendor if the custom store application was required to maintain a list of I.D.s and passwords for each member of each group, especially considering the level of turnover in groups such as university students. Avoiding such I.D. and password maintenance is a significant advantage.

Looking at FIG. 4, even if the URL for the custom store becomes known, someone at another web page 126 would not be able to go to the custom store because the referer field value is not correct.

Figure 5:
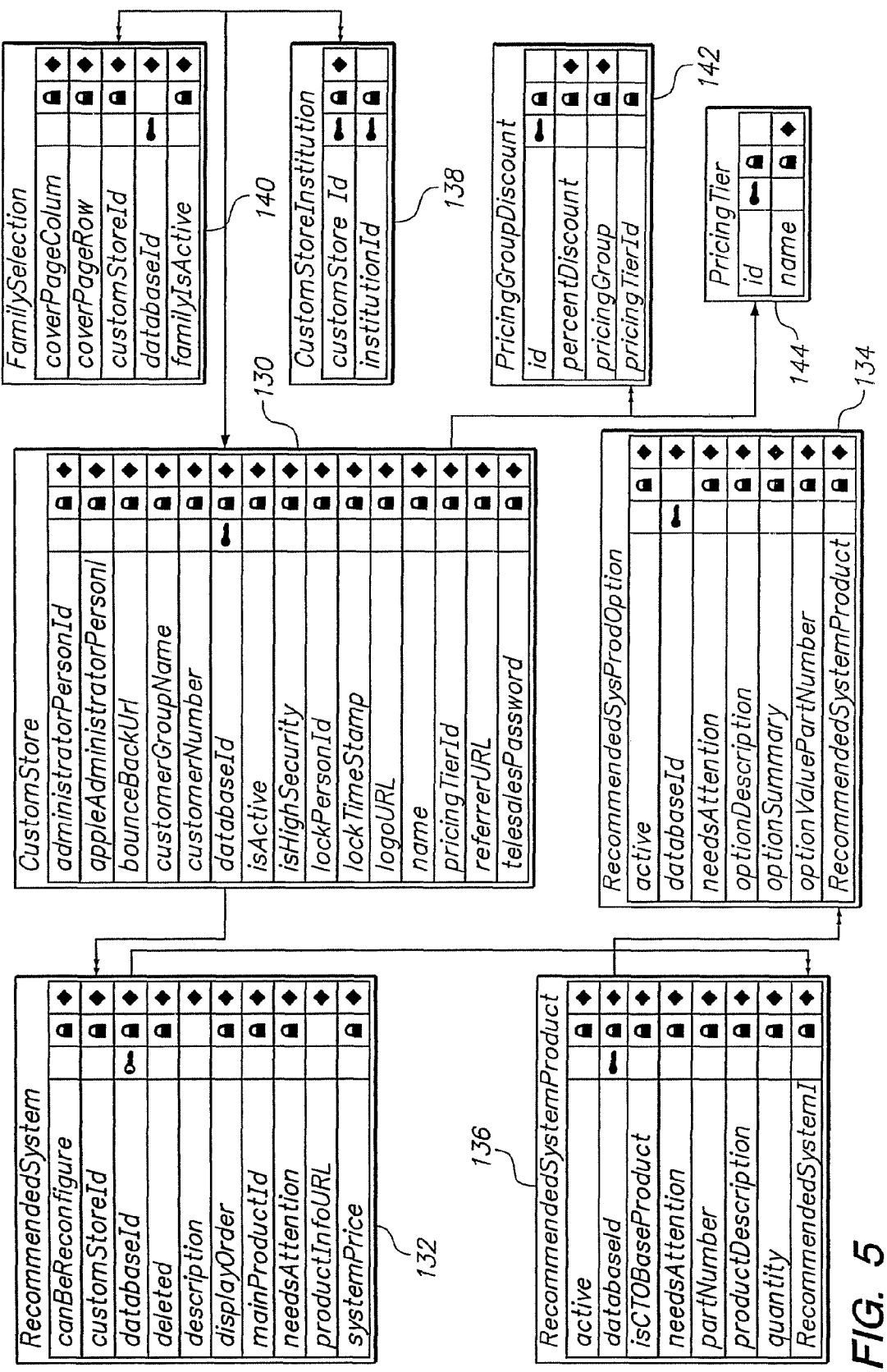
FIG. 5 is a diagram that illustrates one embodiment of the database structure for the custom store of the present invention.

FIG. 5 illustrates one example of a data structure for use with the present invention. As shown in FIG. 5, the data for the custom store in block 130 includes a customer number, a database I.D., an "Is Active" field, an "Is High Security" field (the "Is High Security" field indicates whether the custom web store implements the security shown in FIG. 4). Also shown is a name field (for example the University of X), a pricing tier I.D. (for example, tier C), and a referrer URL field used in the scheme of FIG. 4, the store type I.D. which indicates the general type of the store (such as a university custom web page or institutional custom web page, K-12 web page, consumer group web page, or the like). Each different store type I.D. can be used to set up a different type of custom store.

The custom store also includes recommended systems data in block 132. Block 22 includes the "Can Be Configured" field that determines whether a bundle can be modified by the group member or must be chosen in a "take it or leave it" fashion. A description field includes a description of the recommended system that can be input by the administrator. The "Display Order" field provides a number that indicates the order in which the recommended system is displayed on the recommended systems display page. The Main Product I.D. is an indication of the main product in the bundle. The "Needs Attention" field is set by the reconciliation application when a product in a bundle becomes obsolete.

The recommended system includes a number of recommended system products, each having a block 136. These include the part number, recommended system I.D., "Needs Attention" field, and the like. Also a number of options in the "Option" field 134 are associated with each of the system products. Note that block 138 for the custom store institution can refer to a number of different custom stores for that institution. Alternately, more than one institution can be associated with one custom store. The custom store block 130 can also include a Family Selection block 140. The custom store block 130 also includes indications which point to data for different discounts which can be implemented as Pricing Group Discount block 142 and Pricing Tier block 144.

In one embodiment, database structure is set up with pointers which refer to the different data elements. By using pointers, the discounted values of the products need not be stored as a value but merely as pointers to the discount tiers and to the main price data. Alternately, the discount price data can be stored in the custom store data as shown in FIG. 2B.

FIG. 6 illustrates an example of an external administrator web page which allows for the easy creation of the configuration data for the custom store web pages. In this example, the web page lists a number of different arrangements, each arrangement including a system description 120 that allows the administrator to type in a description title, display order 122 which allows the administrator to set the order of the display of the recommended systems, a product info URL 124 which allows for use of the customized web page to describes the recommended system, a "can be configured" box 126 indicates whether the system configuration can be modified by the purchaser. Also an "Edit" button 130 allows the administrator to modify the elements in the recommended system. Elements can be added or subtracted from the recommended system. A "Delete" button 132 allows the entire recommended system to be removed. The page shown also includes an "Add New System" button 138 which allows the creation of a new recommended system. The "Add New System" page (not shown) includes a list of different products which can be selected to create the recommended systems (virtual bundles). The system also includes a preview of the recommended system page in which a mock-up of the system page in the custom store is shown to the administrator. Once the configuration is suitable, the administrator publishes the changes to the custom store using the "Publish" option in the web page.

Figure 7:
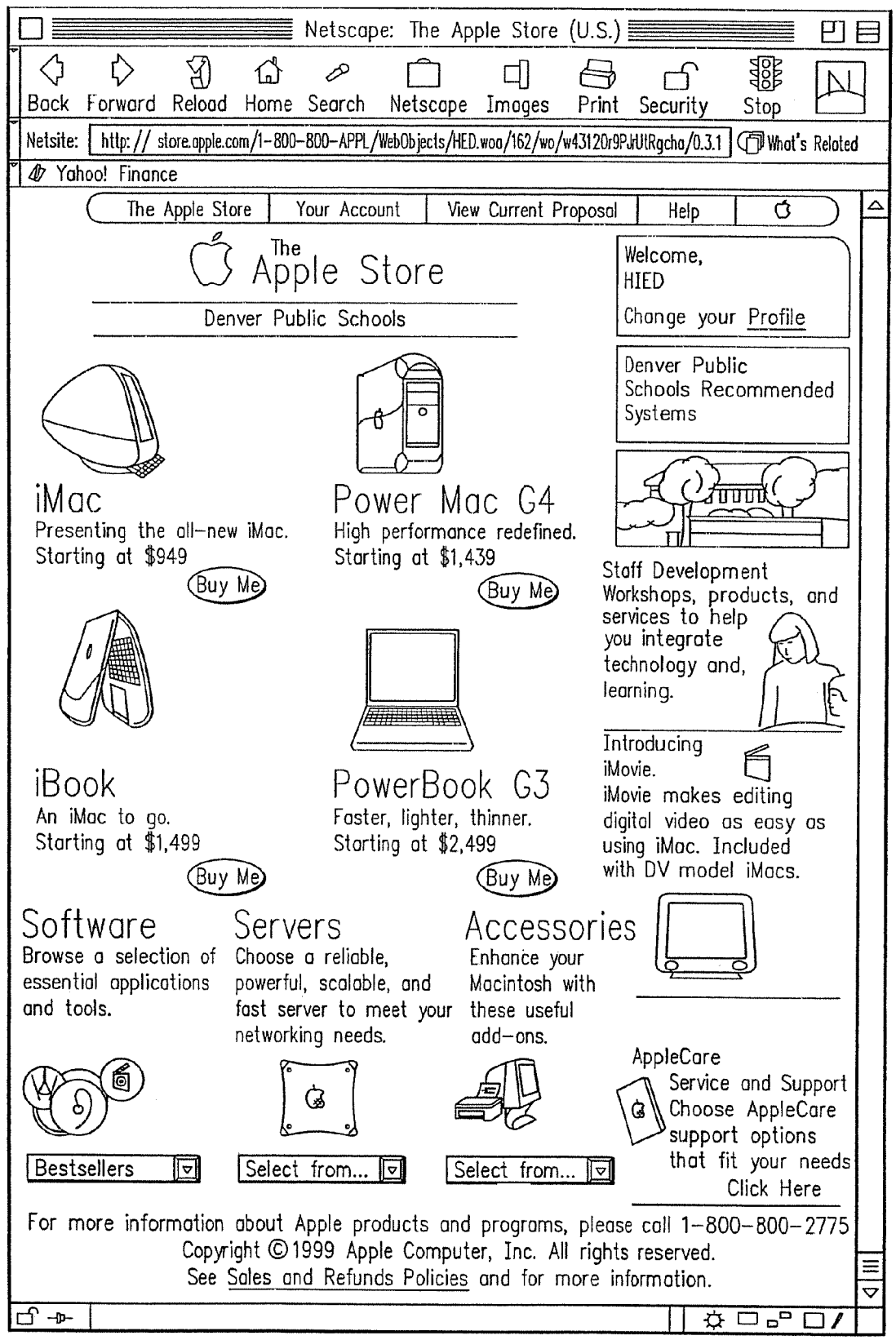
FIG. 7 is a diagram of a web page illustrating the front page of a custom store application of one embodiment of the present invention.

FIG. 7 illustrates an example of a front page for a custom store web site.

In one embodiment, the front page generally follows the arrangement of the main store web site. The administrator can block from purchase some of the displayed products. For example, some administrators may want to prevent group members from purchasing iBooks. A recommended systems icon allows the user to go to the recommended systems page.

FIG. 8 shows a recommended systems page. The recommended system page is arranged by the external administrator. Group members can select virtual bundles chosen by the external administrator from the recommended systems page.

Virtual bundles are described in more detail in the patent application "Virtual Bundles," Ser. No. 09/566,718, filed on the same day as the present application and incorporated herein by reference.

The foregoing has described the principles, preferred embodiments and modes of operation of the present invention. However, the invention should not be construed as limited to the particular embodiments discussed. Instead, the above described embodiments should be regarded as illustrative rather than restrictive, and it should be appreciated that variations may be made in the embodiments by workers skilled in the art without departing from the scope of the present invention as defined by the following claims.

What is claimed is:

1. A non-transitory computer-readable medium having stored thereon, computer-executable instructions that, if executed by a computing device, cause the computing device to perform a method comprising:
    in response to receiving a request to store web-page configuration data, received via a computer interface secured for custom-store administration at a custom-store-administrator computer, determining whether the request is from an authorized administrator associated with a group other than the vendor,
    if the request is determined to be from an authorized administrator associated with a group other than the vendor, storing configuration data in a database in association with the group, the configuration data being securely usable to arrange at least a portion of a vendor's custom-store web page for separate use by members of the group;
    in response to receiving a browser request for a URL that includes a store identifier for a custom-store, verifying whether the browser request is associated with the group; and
    if the browser request is verified to be associated with the group, dynamically producing the custom-store web page corresponding to the group, the custom-store web page being constructed using data from the database, the data including the configuration data associated with the group.

2. The computer-readable medium of claim 1, wherein the method further comprises setting up multiple custom stores to a web page for different groups.

3. The computer-readable medium of claim 1, the method further comprising producing an administration web page that allows the custom-store-administrator computer to modify the custom pages, wherein the custom-store- administrator computer is external to the computing device.

4. The computer-readable medium of claim 3, wherein the administration web page enables the creation of virtual bundles of products for sale using the custom store web page.

5. The computer-readable medium of claim 4, wherein the virtual bundles are shown as a recommended system on a main store web page.

6. The computer-readable medium of claim 1, wherein the configuration data prevents the selection of certain products by group members at the custom web page.

7. The computer-readable medium of claim 1, wherein the configuration data pertain to the product display on the custom store web page.

8. The computer-readable medium of claim 1, wherein the custom store web page is based upon a main store web page.

9. The computer-readable medium of claim 1, wherein the instructions comprise instantiation software and the method operates in a server system environment.

10. The computer-readable medium of claim 1, wherein the store identifier for the custom-store is an I.D. information field in the URL and a custom store software constructs the custom store using the I.D. information field.

11. The computer-readable medium of claim 1, the method further comprising checking a referrer URL before the construction of the custom store web page.

12. The computer-readable medium of claim 1, wherein the group comprises an institution.

13. The computer-readable medium of claim 1, wherein the method further comprises dynamically calculating discounts for products pertaining to the custom store web pages.

14. The computer-readable medium of claim 1, the method further comprising reviewing the data in the database to determine whether obsolete parts that are no longer offered by the vendor need to be modified at each of the custom stores.

15. The computer-readable medium of claim 14, the method further comprising producing an E-mail notification to the custom-store-administrator computer, notifying the administrator computer of changes that need to be made at the custom store web page.

* * * * *